United States Patent
Nazzer

(10) Patent No.: US 8,728,321 B2
(45) Date of Patent: May 20, 2014

(54) PROCESS FOR SEPARATING ONE OR MORE SOLIDS FROM WATER MISCIBLE FLUIDS AND AN APPARATUS THEREFOR

(75) Inventor: Craig Anthony Nazzer, New Plymouth (NZ)

(73) Assignee: Cameron International Corporation, Houston, TX (US)

( * ) Notice: Subject to any disclaimer, the term of this patent is extended or adjusted under 35 U.S.C. 154(b) by 994 days.

(21) Appl. No.: 12/826,961

(22) Filed: Jun. 30, 2010

(65) Prior Publication Data

US 2010/0264091 A1 Oct. 21, 2010

Related U.S. Application Data

(63) Continuation of application No. 11/587,110, filed on Oct. 20, 2006, now abandoned.

(30) Foreign Application Priority Data

Apr. 15, 2005 (NZ) .................. PCT/NZ05/00077

(51) Int. Cl.
*B01D 1/00* (2006.01)
*B03D 1/00* (2006.01)
*C02F 1/24* (2006.01)
*B01D 17/00* (2006.01)
*C02F 1/26* (2006.01)

(52) U.S. Cl.
USPC .......................................... 210/643; 210/704

(58) Field of Classification Search
None
See application file for complete search history.

(56) References Cited

U.S. PATENT DOCUMENTS

| 2,229,860 A | | 1/1941 | McCurdy |
| 2,257,244 A | | 9/1941 | Oehler |
| 3,617,544 A | | 11/1971 | Voss |
| 3,661,774 A | * | 5/1972 | Masologites ................. 210/634 |
| 3,838,737 A | | 10/1974 | Allen et al. |
| 4,033,866 A | * | 7/1977 | Enzmann ..................... 210/695 |
| 4,125,375 A | * | 11/1978 | Hunter ......................... 436/518 |
| 5,389,208 A | | 2/1995 | Beasley et al. |
| 5,826,469 A | * | 10/1998 | Haradem ....................... 82/1.11 |
| 5,993,608 A | | 11/1999 | Abry et al. |

(Continued)

FOREIGN PATENT DOCUMENTS

| DE | 2258713 | 6/1973 |
| GB | 1391059 | 4/1975 |
| WO | 9314850 A1 | 8/1993 |
| WO | 9745201 A1 | 12/1997 |
| WO | 0021631 A1 | 4/2000 |

OTHER PUBLICATIONS

Machine Translation of FR 2162196 A1 published Jul. 13, 2013.*

(Continued)

*Primary Examiner* — Lore Jarrett
*Assistant Examiner* — Benjamin J Behrendt
(74) *Attorney, Agent, or Firm* — Mossman Kumar & Tyler PC

(57) ABSTRACT

This invention relates to a process for removing solid matter from process liquids that are miscible with water. A brine made from water and dissolved salt and which is more dense than the process liquid is placed underneath and in contact with the mixture of process liquid and solid matter. The particles and pieces of solid matter move from the process liquid and then through the brine. In so doing the process liquid that is carried with the solid matter is displaced by the more dense brine.

11 Claims, 2 Drawing Sheets

(56) References Cited

U.S. PATENT DOCUMENTS

| | | | |
|---|---|---|---|
| 6,340,373 B1* | 1/2002 | Billington | 23/295 R |
| 6,685,802 B1* | 2/2004 | Nazzer | 203/1 |
| 2002/0162393 A1 | 11/2002 | Kaduchak et al. | |
| 2004/0226437 A1 | 11/2004 | Stenersen et al. | |

OTHER PUBLICATIONS

Riera-Franco de Sarabia et al., "Application of high-power ultrasound to enhance liquid/solid particle separation processes," Ultrasonics 38 (2000, pp. 642-646.

* cited by examiner

PROCESS FOR SEPARATING ONE OR MORE SOLIDS FROM WATER MISCIBLE FLUIDS AND AN APPARATUS THEREFOR

CROSS-REFERENCE TO RELATED APPLICATION

This application is a divisional application of U.S. patent application Ser. No. 11/587,110 filed Oct. 20, 2006.

FIELD OF THE INVENTION

This invention relates generally to a process and an apparatus therefor for separating one or more solids from a water miscible liquid. The invention may be utilised on its own, or in combination with the likes of a process and/or apparatus described in U.S. Pat. No. 6,685,802 ("the '802 patent") the process of U.S. Pat. No. 5,993,608, ("the '608 patent"), the process of U.S. Pat. No. 6,340,373 ("the '373 patent"), and the process of U.S. Pat. No. 5,389,208 ("the '208 patent") the disclosures of which are incorporated in their entirety.

BACKGROUND

Many industrial and commercial processes utilise a process liquid that is partially or wholly miscible with water. It is often necessary to separate undissolved solids from a process liquid in which case the solids are typically removed as part of a slurry or sludge. If the slurry or sludge is valuable and/or requires additional treatment the presence of process liquid in the slurry or sludge can contaminate the slurry or sludge and/or cause difficulties with the additional treatment of the slurry or sludge. If, on the other hand, the slurry or sludge is unwanted and/or destined for disposal, the slurry or sludge is typically disposed of as waste material. The presence of valuable, noxious or toxic process liquids in the slurry or sludge can give rise to problems including
  the release of potentially harmful substances into the environment,
  the requirement to purchase process liquid to replace what has been lost with the slurry or sludge,
  the requirement to purchase and operate complex equipment and systems to recover the process liquid from the waste slurry or sludge, and/or
  inefficient energy use.

It is an object of the present invention to overcome or substantially reduce in severity the above-mentioned difficulties or to at least provide the public with a useful alternative. More particularly, the present invention provides a process to separate one or more solids from a process liquid and an apparatus therefor, or to at least provide the public with a useful alternative.

An industrial application where these problems arise is in the removal of salt from glycol that is used for dehydrating gas and for preventing hydrate formation in oil and gas production facilities. The demineralisation is typically done by a flash vaporisation process in which a heated recycle liquid provides heat to vaporise an aqueous stream of glycol while collecting precipitated salt and other solid material in a liquid residue that can then be removed from the process. The processes described in the '802, '608, '373 and '208 patents each include a flash vaporisation process similar to the above and such flash vaporisation processes have been or are being applied in the oil and gas industry to remove unwanted salt from glycol. A shortcoming of each of these processes is that the waste residue containing unwanted solid material also typically contains a significant amount of glycol, leading to the abovementioned problems. To overcome these problems additional equipment such as settling tanks, centrifuges, filter presses, membranes, molecular sieves, and ion exchange devices have been installed, or considered for use, to reduce the amount of glycol that is disposed of with the waste material. For some applications settling tanks can be the simplest of these options, however sedimentation, which is what occurs within settling tanks, can only reduce the glycol content in the waste material by a limited degree. The other choices may offer better performance but usually at considerably higher cost and complexity.

SUMMARY OF THE INVENTION

In a first aspect there is provided a process to separate at least a portion of solid matter from a mixture including a process liquid that is substantially miscible with water and the solid matter, the method including the steps of
  (a) placing the mixture of process liquid and solid matter into a reservoir;
  (b) introducing beneath the mixture a second water miscible liquid having a density greater than the density of the process liquid and allowing at least a portion of the solid matter and any process liquid bound thereto to move through at least a portion of the second water miscible liquid; and
  wherein the passage of the portion of solid matter through the portion of second water miscible liquid displaces at least a portion of the less dense process liquid bound to the portion of the solid matter.

Preferably, the process further includes the step of removing the solid matter having at least a portion of the process liquid displaced therefrom, from the second water miscible liquid.

Preferably, the second water miscible liquid is water that contains a quantity of dissolved salt such that its density is greater than that of the process liquid.

Preferably, the process liquid includes one or more glycols, one or more alcohols, one or more amines, and/or a mixture thereof.

Preferably, the one or more glycols are selected from ethylene glycol and/or diethylene glycol.

Preferably one or more mechanical devices assist the movement of the solid matter through the second water miscible liquid.

Preferably, the process further includes the step of applying high frequency sound waves to assist the displacement of the process liquid from the solid matter in the second water miscible liquid.

In a second aspect, the present invention provides a process to separate at least a portion of solid matter from a mixture including a process liquid that is substantially miscible with water and the solid matter, the method including the steps of
  a) placing the mixture of process liquid and solid matter into a reservoir;
  b) introducing beneath the mixture a second water miscible liquid having a density greater than the density of the process liquid and allowing at least a portion of the second water miscible liquid to move upwards through at least a portion of the mixture of solid matter and process liquid and
  wherein the passage of the portion of second water miscible liquid through the portion of the mixture of process liquid and solid matter displaces at least a portion of the less dense process liquid bound to the portion of the solid matter.

Preferably, the process further includes the step of removing the solid matter having at least a portion of the process liquid displaced therefrom, from the second water miscible liquid.

Preferably, the second water miscible liquid is water that contains a quantity of dissolved salt such that its density is greater than that of the process liquid.

Preferably, the process liquid includes one or more glycols, one or more alcohols, one or more amines, and/or a mixture thereof.

Preferably, the one or more glycols are selected from ethylene glycol and/or diethylene glycol.

Preferably one or more mechanical devices assist the movement of the solid matter through the second water miscible liquid.

Preferably, the process further includes the step of applying high frequency sound waves to assist the displacement of the process liquid from the solid matter in the second water miscible liquid.

In a third aspect, the present invention provides a process for removing at least a portion of one or more dissolved solids from a feed mixture including one or more dissolved solids and a process liquid that is substantially miscible with water, the process including the steps of:
  rapidly boiling or flashing at least a portion of said feed mixture by commingling said feed mixture with a heated recycle liquor stream in a first heating zone to produce a vapour, and a residuum including unvaporised process liquid and precipitated solid matter;
  collecting at least a portion of the residuum in a liquid pool in a reservoir;
  drawing a recycle liquor stream from said liquid pool;
  heating said recycle liquor stream in a second heating zone to produce a heated recycle stream that contains sufficient heat to vaporise at least a portion of the feed mixture when said heated recycle liquor and the feed mixture are commingled in the first heating zone;
  introducing beneath at least a portion of the residuum a second water miscible liquid having a density greater than the density of the process liquid and
  allowing the movement of at least a portion of the precipitated solid matter and process liquid bound thereto from said portion of the residuum into and through at least a portion of the second water miscible liquid, and wherein said movement into the second water miscible liquid displaces at least a portion of the less dense process liquid bound to the precipitated solid matter.

Preferably, the process further includes the step of removing the solid matter having at least a portion of the process liquid displaced therefrom, from the second water miscible liquid.

Preferably, the second water miscible liquid is water that contains a quantity of dissolved salt such that its density is greater than that of the process liquid.

Preferably, the process liquid includes one or more glycols, one or more alcohols, one or more amines, and/or a mixture thereof.

Preferably, the one or more glycols are selected from ethylene glycol and/or diethylene glycol.

Preferably one or more mechanical devices assist the movement of the solid matter through the second water miscible liquid.

Preferably, the process further includes the step of applying high frequency sound waves to assist the displacement of the process liquid from the solid matter in the second water miscible liquid.

In a fourth aspect, the present invention provides an apparatus for separating a process liquid that is substantially miscible with water from a mixture including solid matter and the process liquid the apparatus including
  (a) a reservoir to hold in use the mixture of solid matter and the process liquid in the reservoir, and;
  (b) a conveying means proximate the base of the reservoir for bringing the upper layer of a second water miscible liquid having a density greater than the density of the process liquid into contact with the lower layer of the mixture of process liquid and solid matter so that at least a portion of the solid matter passes from the reservoir through at least a portion of the second water miscible liquid.

Preferably, the apparatus further includes an outlet means for allowing the removal of at least a portion of the solid matter from said at least a portion of the second water miscible liquid.

Preferably, the conveying means is a downcomer pipe that extends downwardly from the base of the reservoir. More preferably, the downcomer pipe is further adapted internally to include surface area increasing means therein for increasing the horizontal and/or inclined surface area along which solid matter can move and make contact with the second miscible liquid. Preferably, the downcomer pipe includes a series of internally spaced apart steps, or an arrangement of a plurality of loose objects.

It is to be understood that the term "process liquid that is substantially miscible with water" as used throughout the specification, means a liquid that includes more than 90 weight percent of; one or more glycols, and/or, one or more amines, and/or, one or more alcohols, and/or, another liquid that is more than 80% soluble in water at room temperature.

It is to be understood that the term "bound" when used to define the process liquid bound to the solid matter means process liquid that is associated with, dragged by, carried on or entrained by the solid matter and which process liquid despite being "bound" can be readily displaced upon passage of the solid matter through at least a portion of the second water miscible liquid.

It is also to be understood that the term "solid matter" as used throughout the specification means solid material that includes one or more individual particles of regular or irregular shape, one or more individual crystals, and/or one or more loosely bound agglomerations/conglomerations of such particles and/or crystals. It is further understood that such solid matter may change its form when it passes from the mixture of process liquid and solid matter into and through at least a portion of the second water miscible liquid.

Further aspects of this invention which should be considered in all its novel aspects will become apparent from the following description given by way of example of possible embodiments thereof, and in which reference is given to the accompanying drawings in which:

DETAILED DESCRIPTION OF THE INVENTION

A special characteristic of water is that it has a high capacity to dissolve a wide range of solids, including many unwanted solids that can be found in some industrial process liquid streams. A saturated or near saturated solution of such solids dissolved in water ("brine") can have a density that is significantly higher than that of pure water. For example the density of brine that contains 340 g of dissolved sodium chloride per litre of water is greater than 1.19 g/cc at room temperature, compared to 1.0 g/cc for pure water. More importantly, the density of such brine is higher than that of the liquids used today in many industrial and commercial processes.

By way of illustration the discussion below shows how the present invention would work when used to separate unwanted salt particles from valuable and/or toxic process liquids.

By way of specific examples, the processes described in the '802, '608, '373, and '208 patents, when applied to the processing of glycols or amines, can be made more industrially efficient through the application of this invention to remove salt particles as a waste stream while minimising the amount of process liquid that is removed with the waste material.

Figure 1:
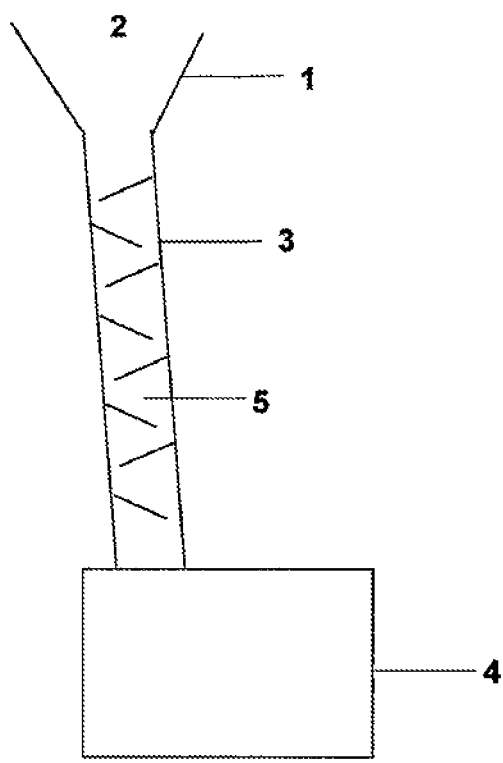
FIG. 1 shows schematically an outline of an apparatus used in a process for removing solid matter from the lower portion of a vessel that contains process liquid and unwanted solid matter.

As shown in FIG. 1, the lower portion of a reservoir 1 contains a mixture including process liquid 2 that is substantially miscible with water and undissolved solid matter in particulate form. A conveying means such as a downcomer pipe 3 is connected proximate the base of the reservoir. A solids collection tank 4 is connected to the outlet of the conveying means. The solids collection tank and the conveying means are filled with a brine 5 that is more dense than the process liquid. The conveying means enables undissolved solid matter to move from the reservoir through the brine and into the solids collection tank. In passing from the reservoir and into the conveying means the solid matter drags or otherwise carries some process liquid with it into the top section of the conveying means. As the solid matter passes along the conveying means, the brine dilutes and displaces the less dense process liquid that is bound or carried with the solid matter and blocks its further descent such that there is only a negligible amount of process liquid entering the solids collection tank. The solids laden brine can then be disposed of with or without further treatment.

Figure 2:
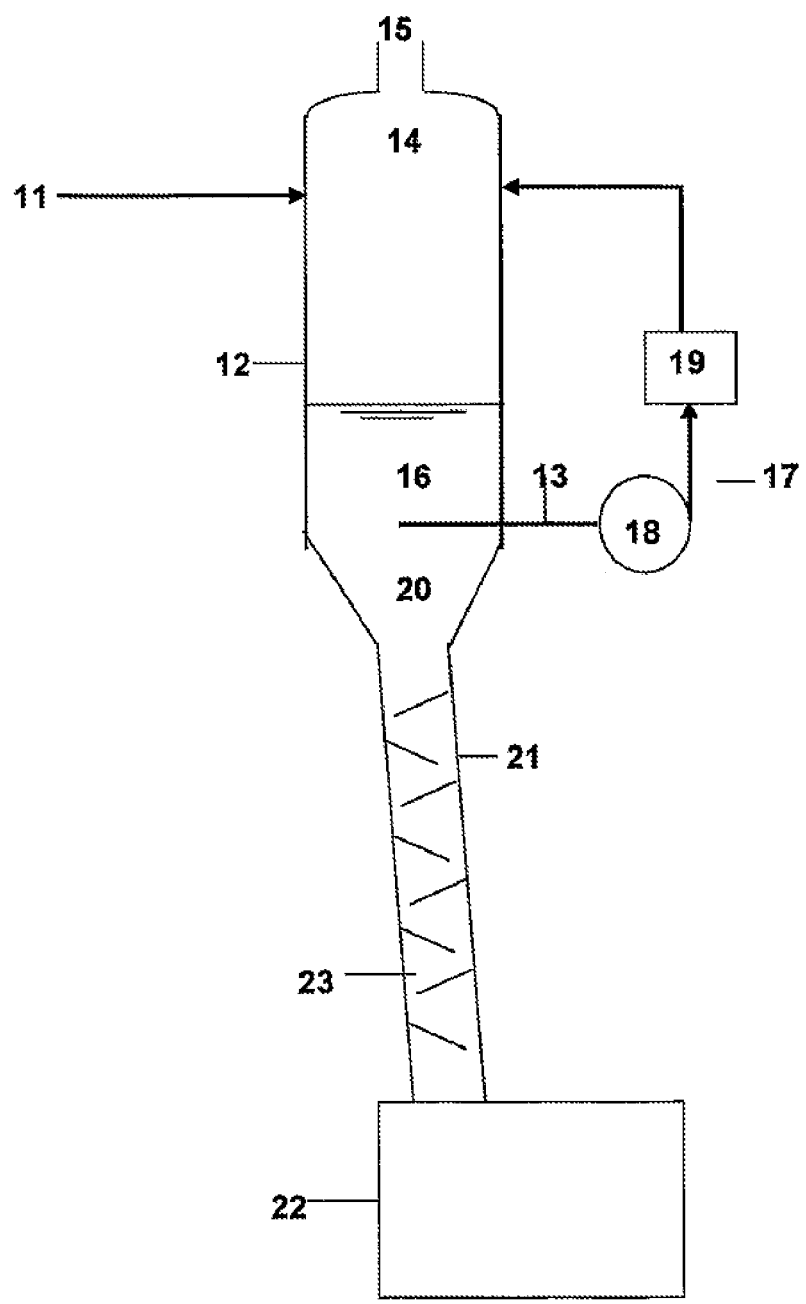
FIG. 2 shows schematically an outline of an apparatus that includes the apparatus in FIG. 1 in conjunction with certain elements of the apparatus described in the '802 patent.

FIG. 2 illustrates more particularly how this invention can be added to the apparatus described in the '802 patent. The feed stream 11 is a free flowing mixture including two or more miscible liquids and dissolved solids. One or more of the liquid component(s) boils at a significantly higher temperature than the other liquid components. Examples of such mixtures include glycol/water and amine/water that are contaminated with dissolved salts, corrosion products and/or other unwanted solids.

With reference to FIG. 2 the feed stream 11 enters the separation vessel 12 and mixes with a larger and hotter stream of recycle liquor 13 that has also entered the separation vessel 12. The recycle liquor 13 preferably immediately heats the feed stream 11 and thereby causes the feed stream to boil rapidly or flash.

Alternatively, the feed stream 11 and recycle liquor 13 may be mixed upstream of the separation vessel 12 and the commingled streams injected into the separation vessel 12.

The vapour 14 generated by the flashing feed stream flows out of the separation vessel through the outlet channel 15. This vapour contains essentially no solids unless there is significant carryover of small particles or liquid droplets into the vapour.

Solids and unvaporised liquid collect in liquid pool 16 in the lower half of the separation vessel 12. The flash vaporisation that has occurred ensures that the liquid pool is composed mainly of the higher boiling point liquid components.

A recycle liquor 13, is drawn from the liquid pool and enters the recycle circuit 17 where it is pumped by the recycle pump 18, heated by the recycle heater 19 and mixed with the feed stream 11 as described above.

The liquid pool 16 in the separation vessel becomes saturated with dissolved solids and remains saturated or supersaturated and laden with solid matter for normal operating conditions. The dissolved solids carried into the separation vessel by the feed stream 11 continually precipitate typically in the form of crystals and add to the quantity of solid matter already present in the liquid pool 16.

Undissolved solids must be removed from the liquid pool 16 to prevent excessive accumulation of solid matter in the separation vessel. To achieve this the separation vessel is provided with a section 20 into which solid matter can collect without then being swept into the recycle circuit by the flow of recycle liquor 13, conveying means 21 is connected to section 20 of the separation vessel, solids collection tank 22 is connected to the outlet of the conveying means 21, and both the conveying means and the solids collection tank 22 are filled with brine 23 that has a density greater than that of the process liquid. Solid matter collects in section 20 of the separation vessel and is then conveyed by the conveying means 21 into and through the brine 23 and into the solids collection tank 22.

In passing from the separation vessel 12 and into conveying means 21 the solid matter drags or otherwise carries some process liquid with it into the top section of the conveying means. As the solid matter passes along the conveying means, the brine 23 dilutes and displaces the less dense process liquid that is bound or is carried with the solid matter and blocks its further descent such that there is only a negligible amount of process liquid entering the solids collection tank 22.

If the flash vaporisation process is as described in the '608, '373, and '208 patents then the separation vessel does not have a section in which a substantial quantity of solid matter can collect without then being swept into the recycle circuit. In these cases solid matter accumulates to approximately the same degree in both the separation vessel and the recycle circuit and this invention enables solid matter to be removed from the recycle circuit and/or directly from the separation vessel. The method is similar to that described in the preceding two paragraphs whereby a portion of the solids laden liquid in the separation vessel and/or the recycle circuit is introduced into the top section of a brine filled conveying means that enables solid matter to move into and through the brine and into a brine filled solids collection tank. As described above the brine dilutes and displaces the less dense process liquid that is being carried with the solid matter and blocks its further descent such that there is only a negligible amount of process liquid entering the solids collection tank.

The relatively high density of the brine is an important factor in this invention that impedes the descent of the process liquid. This impediment to the movement of process liquid can be made more effective if the volume of the system is "closed", meaning that as each particle of solid material enters the solids collection tank it displaces an equal volume of brine, which in turn has nowhere to go except up the conveying means against the flow of solid particles. Ultimately the volume of solid matter that passes out of the reservoir or separation vessel is replaced by an equal volume of brine, and because this brine is more dense than the process liquid it effectively impedes the downward movement of process liquid.

The conveying means may be any suitable means for bringing the second miscible liquid into contact with layer of the mixture of process liquid and solid matter in the reservoir and for allowing the movement of at least a portion of the solid matter and any process liquid bound thereto from the reservoir into and through at least a portion of the second water miscible liquid.

Preferably the conveying means is a straight vertical or steeply inclined pipe ("downcomer pipe"). Other suitable means include an assembly of pipes comprised of one or more horizontal sections, one or more vertical sections, one or more inclined sections, one or more spiral sections, one or more bends and/or any combination thereof.

The performance of the process or apparatus may be further optimised by adding surface area increasing means to the conveying means. Surface area increasing means may be any suitable means of increasing the horizontal and/or inclined surface area along which solid matter can move and make contact with the second miscible liquid.

Preferably the surface area increasing means when added to the preferred conveying means is series of inclined steps fitted inside a downcomer pipe.

Other suitable surface area increasing means include inclining or making horizontal one or more sections of the conveying means, and/or by fitting steps, bars, corrugated plates, loose balls, other loose objects of regular or irregular shape, tower packing materials or the like, and/or combinations thereof, into the conveying means.

One benefit of adding surface area increasing means is that the solid particles slide along and/or tumble from numerous surfaces until they are collected in the solid collection tank. The process and apparatus can be further optimised by extending the length of the conveying means. These optimisations mean that the moving solid matter is exposed to brine for a longer time and/or with a preferred degree of turbulence such that the brine can more efficiently displace the process liquid in contact with the solid matter.

Another benefit of adding surface area increasing means to the conveying means is that the volume inside the conveying means is thereby reduced, which in turn increases the velocity of the brine moving up the conveying means and/or reduces the volume of brine that is needed to separate the process liquid from the solid matter.

There are at least three further benefits in adding surface area increasing means to the conveying means. Firstly the solid matter settles towards the added horizontal and/or inclined surfaces and then moves by gravity or by mechanical means along such surfaces. The liquid that is above this zone of settled solid matter is relatively depleted of solid matter, however this liquid is moving up the conveying means against the flow of solid matter. The horizontal and inclined surfaces minimise the undesirable entrainment of small solid particles with this upflow of liquid by enabling the solid matter that is flowing along such surfaces to drag along a significant portion of the small solid particles.

Secondly a preferred degree of tumbling of the solid matter can be established such that lumps of agglomerated solid matter, if present, are broken up so as to expose more of the process liquid trapped inside such lumps to the brine and thereby assist the brine to displace such process liquid.

Thirdly the solids depleted liquid described above contains a higher percentage of brine, and therefore has a higher density, than the liquid beneath it that surrounds the individual particles and/or pieces of solid matter that are sliding along the horizontal and inclined surfaces. The force of gravity will encourage the relatively brine rich liquid to descend and displace the relatively brine depleted liquid beneath it, which will improve the performance of the process.

There are at least three further benefits in extending the contact time between the brine and the undissolved solid particles. Firstly this provides more time for nucleation, crystal growth, particle growth and the like that can result in fewer but larger particles of solid matter, which in turn typically have relatively less surface area to which process liquid can adhere. Larger particles of solid matter are also less likely to be entrained with the upward flow of brine in the conveying means.

Secondly there is more time for lumps of agglomerated solid matter, if present, to be broken up so as to expose more of the process liquid trapped inside such lumps to the brine and thereby assist the brine to displace such process liquid.

Thirdly there is more time for certain undissolved solid matter, if present, to be dissolved in the brine, which can cause some salt in the brine to precipitate. If such solid matter is in the form of very small particles or if it had other undesirable characteristics, then the performance of the process may improve if the small particles are dissolved in the brine. This also applies if sodium chloride or the like precipitates out of the brine because sodium chloride crystals are typically relatively large and have been found through experimentation to be easy to process with this invention.

It is known that ultrasound and similar high frequency energy can be used to clean surfaces. In this invention the separation of process liquid from solid matter may be improved by applying such high frequency energy to the fluid in the reservoir, conveying means, and/or salt collection tank.

The movement of solid matter along the conveying means may be assisted, varied and/or controlled by shaking, vibrating, or sharply moving the conveying means or by using one or more mechanical conveying devices, such as augers, screw conveyors, vibrating or oscillating conveyors, or conveyor belts.

An auger or screw conveyor can also substantially extend the length of the contact zone between the solid matter and the brine because the displaced brine follows a helical path along the spiral flute of the auger against and across the flow of solid matter. This helical flow path is typically many times longer than the length of the auger.

When the solid matter reaches the solids collection tank it is substantially separated from the process liquid and a mixture of solid matter and brine can be removed without appreciable loss of process liquid and/or with substantially less risk of releasing harmful substances into the environment. The mixture of brine and solid matter so removed can be used, or it can be disposed of as is or in a number of other ways including, but not limited to, landfill, mixing with water and dumping, further concentrating by centrifuge or filter press, or the like.

The brine in the conveying means may eventually become contaminated with process liquid and thus be impaired in its capacity to separate additional process liquid from the solid matter. To prevent this it has been determined that a small flow of brine up the conveying means is sufficient to flush the contaminated liquid from the conveying means. This could be done continuously and/or by batch. A separate source of brine is not necessary. For example, fresh water or sea water can be added into the lower part of the solids collection tank where it will become sufficiently dense by dissolving salt that is already in the tank.

Density differences again help to make this flushing effective because the replacement brine is more dense than any mixture of brine and process liquid, and therefore more dense than the contaminated brine that is to be flushed out of the conveying means. A slow upward flow of the added brine or "bleedback" will firstly restrict and then reverse the descent of process liquid without excessive mixing. This bleedback flow also helps to strip and carry upwards more process liquid from the surfaces of the solid matter.

Another benefit of the added water is that this ensures that the solid matter consistently moves into a liquid environment that contains progressively less and less process liquid.

As an alternative to the displacement of process liquid from the solid matter as it moves through the brine, the brine can be introduced after the solid matter has accumulated in a tank. In this case the accumulated solid matter may be heavily contaminated with process liquid. When it is decided to remove the solid matter from the tank, water or brine is introduced into the tank beneath the solid matter as the second water miscible liquid. The water or brine is more dense than the process liquid or it becomes such by dissolving at least some of the solid matter that is in the tank. Sufficient water or brine is added until the desired amount of less dense process liquid is displaced upwardly and above any residual amount of accumulated solid matter in the tank. Alternatively enough water or brine can be added so as to completely dissolve all the solid matter in the tank while at the same time displacing the process liquid upwards. In either case the brine and any undissolved or redissolved solids in at least the lower part of the tank become depleted of process liquid and the solid matter can be disposed of.

The process may be further optimised by adding an outlet means to the solids collection tank for allowing the removal of at least a portion of the solid matter from at least a portion of the second water miscible liquid. The outlet means may be any suitable means, such as a valve, for allowing the removal of at least a portion of the solid matter from at least a portion of the second water miscible liquid.

The materials of construction of the apparatus include any that are suitable for the particular application. In most applications carbon steel, stainless steel, glass reinforced plastic, or suitable polymeric materials are appropriate.

It is to be appreciated that the process or apparatus of this invention is not intended to apply to process liquids that contain significant quantities of solids, which solids;
- float or have densities that are close to or below the density of brine;
- agglomerate or coagulate into very large clumps that may trap significant amounts of process liquid and thereby prevent the brine from stripping this liquid from the solid matter;
- adhere firmly to the surfaces of the conveying means or its internal components.

It is also to be appreciated that the process of the invention does not apply to liquids that become solid or non-flowing at the pressure and temperature conditions that exist in the conveying means or solids collection tank.

This invention is well suited for processing ethylene glycol, diethylene glycol, and triethylene glycol. Although glycols are miscible with and heavier than water, and once mixed with water they do not separate by gravity alone, it has however, been surprisingly determined that an undisturbed layer of such glycol will sit on top of an undisturbed layer of brine. Furthermore, this separation of the glycol and brine will persist for some time, with only a small degree of intermingling, provided that the liquids are not vigorously disturbed. The density of glycol is typically less than 1.17 g/cc. The density of brine that is saturated with salt is typically over 1.19 g/cc. By comparison the densities of ordinary tap water and seawater water are about 1.00 and 1.03 g/cc respectively. If the conveying means described above were to contain tap water or seawater the heavier glycol would rapidly sink through it and mix with it, and render the process ineffective. Because glycol is miscible with and more dense than tap water and seawater, the novel use of water in the form of a dense brine to assist in separating glycol from salt as described in this invention is an inventive step.

Where in the foregoing description reference has been made to integers having known equivalents thereof, then those equivalents are herein incorporated as if individually set forth.

Although this invention has been described with reference to particular embodiments and examples, it is to be appreciated that improvements or modifications can be made to the present invention without departing from the scope of the claims.

The invention claimed is:

1. A process to separate at least a portion of solid matter from a mixture including a process liquid that includes more than 90 weight percent of a fluid comprising one or more glycols, one or more alcohols, one or more amines, and/or a mixture thereof, each of which is more than 80% soluble in water at room temperature and the solid matter, the method comprising
    a) placing the mixture of process liquid and solid matter into a reservoir that is connected proximate its base to a conveying means which includes surface area increasing means for increasing the horizontal and/or inclined surface area along which solid matter can move and make contact with the second water miscible liquid;
    b) introducing beneath the mixture a second water miscible liquid having a density greater than the density of the process liquid and allowing at least a portion of the solid matter and any process liquid bound thereto to move through at least a portion of the second water miscible liquid and along the surface area increasing means; and
    wherein the movement of the portion of solid matter through the portion of second water miscible liquid and along the surface area increasing means causes at least a portion of the less dense process liquid bound to the moving portion of the solid matter to be displaced from the moving portion of solid matter.

2. The process as claimed in claim 1 which further comprises removing the solid matter having at least a portion of the process liquid displaced therefrom, from the second water miscible liquid.

3. The process as claimed in claim 1 wherein the second water miscible liquid is water that contains a quantity of dissolved salt such that its density is greater than that of the process liquid.

4. The process as claimed in claim 1 wherein the one or more glycols are selected from the group consisting of ethylene glycol and/or diethylene glycol.

5. The process as claimed in claim 1 wherein one or more mechanical devices assist the movement of the solid matter through the second water miscible liquid.

6. The process as claimed in claim 1 further comprising applying high frequency sound waves to assist the displacement of the process liquid from the solid matter in the second water miscible liquid.

7. A process to separate at least a portion of solid matter from a mixture including a process liquid that includes more than 90 weight percent of a fluid comprising one or more glycols, one or more alcohols, one or more amines, and/or a mixture thereof, each of which is more than 80% soluble in water at room temperature and the solid matter, the method comprising
    a) placing the mixture of process liquid and solid matter into a reservoir;
    b) introducing beneath the mixture a second water miscible liquid having a density greater than the density of the process liquid and allowing at least a portion of the second water miscible liquid to move upwards through at least a portion of the mixture of solid matter and process liquid and wherein the upward passage of the portion of second water miscible liquid through the portion of the mixture of process liquid and solid matter displaces upwardly at least a portion of the less dense process liquid bound to the portion of the solid matter out of the mixture of process liquid and solid matter.

8. The process as claimed in claim 7 which further comprises removing the solid matter having at least a portion of the process liquid displaced therefrom, from the second water miscible liquid.

9. The process as claimed in claim 7 wherein the second water miscible liquid is water that contains a quantity of dissolved salt such that its density is greater than that of the process liquid.

10. The process as claimed in claim 7 wherein the one or more glycols are selected from the group consisting of ethylene glycol and/or diethylene glycol.

11. The process as claimed in claim 7 wherein one or more mechanical devices assist the movement of the solid matter through the second water miscible liquid.

* * * * *